(12) United States Patent
Weichmann et al.

(10) Patent No.: US 9,162,373 B2
(45) Date of Patent: Oct. 20, 2015

(54) HEATING SYSTEM AND METHOD OF HEATING A BODY OF A PREFORM (75) Inventors: Ulrich Weichmann, Aachen (DE); Holger Moench, Vaals (NL); Jens Pollmann-Retsch, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 232 days.

(21) Appl. No.: 13/264,162

(22) PCT Filed: Apr. 19, 2010

(86) PCT No.: PCT/IB2010/051684
§ 371 (c)(1),
(2), (4) Date: Feb. 20, 2012

(87) PCT Pub. No.: WO2010/122469
PCT Pub. Date: Oct. 28, 2010

(65) Prior Publication Data
US 2012/0273480 A1 Nov. 1, 2012

(30) Foreign Application Priority Data

Apr. 21, 2009 (EP) .................................. 09158329

(51) Int. Cl.
*B29C 49/68* (2006.01)
*B29B 13/02* (2006.01)
*B29C 49/06* (2006.01)
*B29C 49/64* (2006.01)
*B29C 35/08* (2006.01)

(52) U.S. Cl.
CPC ............... *B29B 13/025* (2013.01); *B29C 49/06* (2013.01); *B29C 49/6418* (2013.01); *B29C 49/6436* (2013.01); *B29C 2035/0838* (2013.01)

(58) Field of Classification Search
CPC .................. B29C 2035/0838; B29C 49/6418; B29C 13/024; B23K 26/06; B23K 26/0639
USPC .......... 219/538, 121.6, 121.76; 264/454, 482, 264/405; 425/174, 74.41, 526
See application file for complete search history.

(56) References Cited

U.S. PATENT DOCUMENTS 3,975,618 A * 8/1976 Goos et al. ..................... 219/388
4,079,104 A * 3/1978 Dickson et al. ................ 264/458
4,147,487 A * 4/1979 Dickson et al. ............ 425/174.4
4,656,325 A * 4/1987 Keefer ........................... 219/728

(Continued)

FOREIGN PATENT DOCUMENTS

JP    2008520467 A    6/2008
WO   2007149221 A2   12/2007

(Continued)

*Primary Examiner* — Dana Ross
*Assistant Examiner* — Lawrence Samuels
(74) *Attorney, Agent, or Firm* — Yuliya Mathis (57) ABSTRACT

The invention describes a heating system (13) for heating a body (1) of a preform having a material thickness bounded by a first surface (2) and a second surface (4). The heating system (13) comprises at least a light source arrangement (12) which is arranged to emit a number of directed light beams (17) and a coupling arrangement (15, 21) realized to deliberately couple light from the light source arrangement (12) in a specific direction into the body (1) during at least a certain minimum period such that the light is essentially guided along a longer path (19) between the first (2) and second surface (4). Furthermore, the invention concerns a method of heating a body (1) of a preform.

14 Claims, 5 Drawing Sheets

(56) References Cited

U.S. PATENT DOCUMENTS

| | | | |
|---|---|---|---|
| 4,894,509 A * | 1/1990 | Chalco et al. | 219/121.6 |
| 5,428,658 A * | 6/1995 | Oettinger et al. | 378/119 |
| 5,540,350 A | 7/1996 | Lansky | |
| 5,780,524 A * | 7/1998 | Olsen | 522/2 |
| 5,920,677 A * | 7/1999 | Emmer et al. | 392/419 |
| H1911 H | 11/2000 | Land | |
| 6,361,301 B1 * | 3/2002 | Scaglotti et al. | 425/174.4 |
| 6,480,573 B1 * | 11/2002 | Dinsmore | 378/136 |
| 6,528,755 B2 * | 3/2003 | Grewell et al. | 219/121.63 |
| 7,798,800 B2 * | 9/2010 | Evrard | 425/174.4 |
| 8,354,051 B2 * | 1/2013 | Feuilloley et al. | 264/458 |
| 2008/0099961 A1 * | 5/2008 | Feuilloley et al. | 264/405 |
| 2008/0102148 A1 * | 5/2008 | Evrard | 425/174.4 |
| 2008/0305203 A1 * | 12/2008 | Plantamura | 425/174.4 |
| 2010/0127435 A1 * | 5/2010 | Feuilloley | 264/492 |
| 2010/0230863 A1 * | 9/2010 | Moench et al. | 264/405 |
| 2011/0002584 A1 * | 1/2011 | Griffin | 385/43 |
| 2012/0043677 A1 * | 2/2012 | Frankiewicz et al. | 264/1.25 |

FOREIGN PATENT DOCUMENTS

| | | | | |
|---|---|---|---|---|
| WO | WO2008075280 | * | 6/2008 | B29B 13/02 |
| WO | WO 2008075280 A1 * | 6/2008 | H05B 6/00 |

* cited by examiner

HEATING SYSTEM AND METHOD OF HEATING A BODY OF A PREFORM

FIELD OF THE INVENTION

The invention concerns a heating system and a method of heating a body of a preform comprising a material thickness bounded by a first surface and a second surface.

BACKGROUND OF THE INVENTION

Preforms, in particular plastic preforms, are widely used for producing a variety of products ranging from curved surfaces to beverage bottles, for instance. Commonly, before forming such preforms into a desired shape, they have to be heated up to a temperature close to the melting point of the material of the preform. Shaping tools will then alter the shape so that a completely new product evolves. Such shaping methods include deep-drawing or blow-moulding of plastic preforms.

Figure 1:
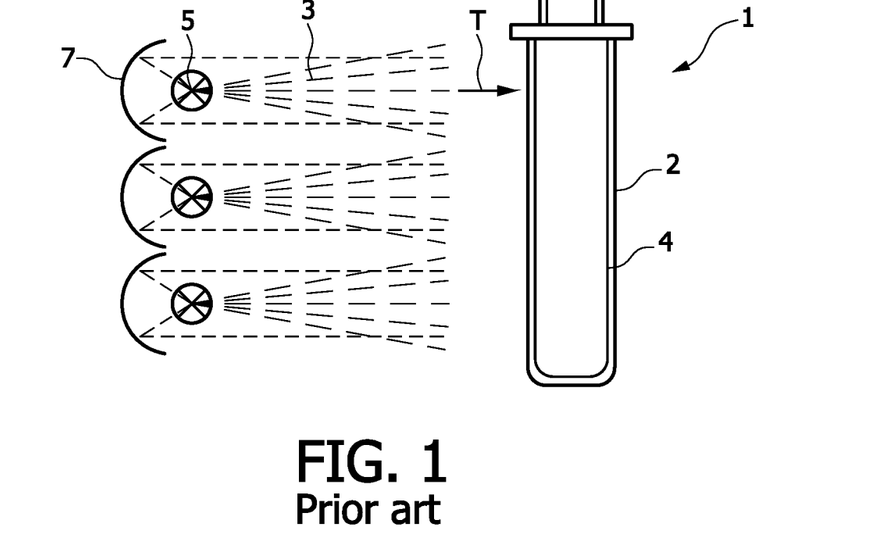
FIG. 1 shows a schematic sectional view of a heating system according to the state of the art.

A well-known application of (blow-)moulding heated preforms is the production of PET (polyethylene therephthalate) bottles which are used for a variety of beverages such as mineral water, juices, lemonade and beer. In order to produce such bottles, a PET preform having a tubular shape is heated by means of halogen lamps. FIG. 1 shows a schematic sectional view of such a heating arrangement according to the state of the art. A body 1 of a preform having a first, outer, surface 2 and a second, inner surface 4 is heated by three halogen lamps 5. For that purpose, mirrors 7 are used to reflect parts of the divergent light 3 emitted by the halogen lamps 5 and to direct the light rays essentially into a traversal direction T of the preform 1. The traversal direction T is defined by a shortest direct line between the first surface 2 and the second surface 4 at a point where the light is coupled into the body 1. Because the light 3 is divergent, i.e. undirected or only partially directed, and consisting of light of many different wavelengths, it does not completely traverse the body 1 in the traversal direction T, but this direction is nevertheless the principal direction of traversal in general. Usually, preforms are moved on a production line along which a multitude of halogen lamps 5 are arranged. This leads to an increase of the temperature to a point where the preforms can be shaped by blowing them inside a mould or also by merely pressing them into the mould.

Figure 2:
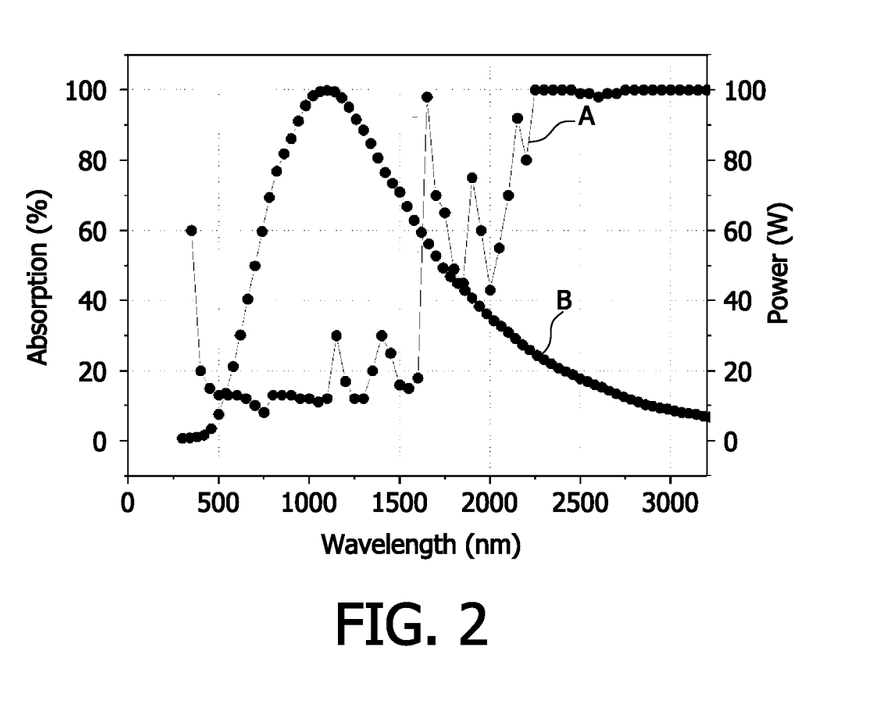
FIG. 2 shows a graph in which the wavelength spectrum of a halogen lamp is plotted on the x-axis, while the left y-axis refers to the corresponding absorption rate of PET and the right y-axis refers to the wavelength spectrum of a halogen lamp.

Halogen lamps emit a broad spectrum of visible and invisible light rays which ranges into the infrared region, as can be seen in FIG. 2. Here, the wavelength spectrum of a halogen lamp (in nanometers) is plotted on the x-axis, while the left y-axis refers to the corresponding absorption spectrum of PET in % and the right y-axis refers to the emission energies of typical halogen lamps in Watts. The first curve A corresponds to the PET absorption spectrum (left y-axis) while the second curve B corresponds to the emmission energy spectrum (right y-axis). It can be observed that the absorption of PET is notably low in the visible and near infrared wavelength ranges up to about 1010 nm, while a higher absorption rate of PET can be realized in between 1010 nm and 2000 nm. Above 2000 nm, PET is basically opaque. The wavelength spectrum of halogen lamps therefore produces an in homogenous heating result, since a significant portion of the halogen lamp spectrum is at wavelengths with a very high absorption by PET, i.e. above 2000 nm. Therefore, the larger portion of the emitted light is absorbed at the outer part of the preform, while its inner part is heated to a much lower extent. For that reason, it is often necessary to cool down the outside of a preform, for instance by spraying water on it, while prolonging the heating process at the same time in order to get the inside of the preform heated up as well. In sum, this leads to a more energy-consuming and longer heating process than would be necessary if a homogeneous heating was applied.

A way to circumvent these drawbacks is to choose a different light emitting system, such as lasers, which only operates at a certain wavelength. This way, the wavelength can be adjusted to the necessities of the heating process, which are mainly determined by the material and the thickness of the preform. For instance, heating a PET preform by means of laser wavelengths at an absorption rate by PET of less than 50% would mean that a more continuous absorption could be achieved, resulting in a lower overall energy input being necessary, i.e. the heating process could be carried out in a more effective way. However, such suitable laser wavelengths are not emitted by typical lasers for everyday use which emit at typical wavelengths of 800 or 970 nm. Unfortunately, in this wavelength range, only a quite low absorption rate of PET of about 15% can be achieved.

Against this background, it is highly desirable to provide a possibility to heat a body of a preform by means of a laser beam—or more broadly—by means of a directed light beam, more effectively and with less regard to the wavelength of the light beam which a light source emits.

SUMMARY OF THE INVENTION

To this end, the present invention describes a heating system for heating a body of a preform having a material thickness bounded by a first surface and a second surface, which heating system comprises at least the following elements:
 a light source arrangement which is arranged to emit a number of directed light beams,
 a coupling arrangement arranged to deliberately couple the light from the light source arrangement in a specific direction into the body during at least a certain minimum period such that the light is essentially guided along a longer path between the first and second surface.

Thus, instead of simply aiming a laser beam or a similar directed beam at a body of a preform so that the beam passes directly through the preform, the invention utilizes a coupling arrangement with which it is possible to deliberately couple light into the body, with the effect that the light is guided inside that body along a longer path than in the case of the prior art. In addition, the light source arrangement may comprise one or several light sources, so that one or several light beams can be produced and coupled in by the coupling arrangement.

As for the length of the path along which such light beam(s) is or are guided, this can generally be characterized as a "longer path". This expression basically signifies that the light does not pass through the two surfaces of the object in the direct shortest line from the entry point at one surface to the other surface, as it would typically do in state of the art solutions. Instead, a longer path is a path which is multiple times, at least twice, as long as the shortest distance between the first and second surfaces (measured at the entry point of the light into the body). Preferably, the longer path is significantly longer than this shortest distance, i.e. at least four times, most preferably at least ten times the shortest distance. In other words, the light is deliberately guided or coupled into the body of the preform so that the light will cover a longer path or trajectory within the body before ultimately exiting the body and/or before being completely absorbed. As there is usually a certain loss of light rays of a light beam—even of a directed light beam—due to scattering effects, it may be noted that essentially guiding such light beam(s) along a longer path or trajectory means that the main part, i.e. at least half of the rays of a light beam, is transported along that path.

A special remark should be made regarding the definition of the expression "to couple in deliberately". In contrast to an accidental coupling, coupling directed light beams into the body deliberately in the manner described above means an intended coupling specifically aimed at making that light beam enter into the body in that specific manner. In particular, this implies a choice of coupling means of the coupling arrangement suitable for coupling in the light beam so that the beam will stay within the body for at least a minimum period and will be guided along the longer path. For that purpose, the coupling means may comprise control means to exactly determine the direction and/or angle at which the light beam is to be coupled into the body and/or physical means that facilitate the exact coupling in the way which is desired.

Concerning the duration of coupling light into the object, a certain minimum period is necessary. Typically, such a period would be exactly the amount of time needed to heat the body of the preform to the desired temperature. In special cases, however, it may be considered necessary to heat the body in a stepwise manner or successively by different light sources. Thus, the minimum period can be considered to be preferably at least one second, more preferably at least two seconds. This way it is ensured that the light is not just accidentally coupled into the body, but deliberately as intended according to the invention. During that minimum period the light can be coupled into the body continuously or in a pulsed manner by light beams originating from one or from several light sources, in parallel and/or successively.

The invention also describes a method of heating a body of a preform comprising a material thickness bounded by a first surface and a second surface, wherein a number of directed light beams from a light source arrangement is sent, i.e. transmitted, through the body, which light from the light source arrangement is deliberately coupled in a specific direction into the body within at least a certain minimum period such that the light beam is essentially guided along a longer path between the first and second surface.

The dependent claims and the subsequent description disclose particularly advantageous embodiments and features of the invention.

With the heating system and method according to the invention, it is now possible, for example, to use a conventional laser source with an emission wavelength of 800 and/or 970 nm to heat up a body of a preform with very little loss of energy, since the light is guided within the body itself and absorbed there more homogeneously than can be achieved with state of the art approaches. In fact, the absorption is low enough not to overheat the body, so that additional cooling of the preform is usually not necessary. This is all the more so because the heating does not only take place in a concentrated manner on the surface of the body, but throughout the area between the two bounding surfaces where the light beam is guided through. Therefore, in a very preferred embodiment of the invention, the light source arrangement comprises at least one laser emitting light source, which most preferably emits laser light at a wavelength of 800 nm and/or 970 nm.

According to a preferred embodiment, the coupling arrangement is arranged such that the light from the light source arrangement, i.e. one or more of the number of light beams, is coupled into the body at an angle within an acceptance angle range of the material of the body and such that it is guided between the first and second surface by total internal reflection. For that purpose, the coupling arrangement may, for example, comprise a laser source that directs a laser beam at the body in an appropriate angular direction. Once coupled into the body, the light beam is guided in such a way that it is essentially completely (i.e. for its main part) internally reflected at the bounding surfaces so that it remains within the body for a longer time and thus travels a longer path. The acceptance angle will vary depending on the material of the body of the preform. For instance, the refraction index of air is approximately 1, while that of PET is in the range of 1.54 to 1.575. A suitable angle for coupling in the light beam depends on the refractive indices of the material of the preform, of the material from which the light beam is coupled in and of the material in the environment of the preform at the point where total reflection is to occur, as well as on the shape of the preform along the path where the light beam is intended to travel.

It is thus particularly preferred that the coupling arrangement be arranged such that the light from the light source arrangement is guided between the first and second surfaces until it is essentially absorbed along the path. That means that at least half, more preferably at least 80%, of the energy of each light beam is absorbed by the preform body while the beam is travelling within the body. In this way it is ensured that the energy of the light beam is used as effectively as possible, which can be realized in particular by the use of total internal reflection, as noted above.

In order to control the process of coupling in the light beam, it is particularly preferred that the coupling arrangement is arranged such that the light from the light source arrangement, e.g. a light beam, is coupled into the body at a previously defined entry point and/or along a previously defined entry line, wherein an "entry line" can be essentially regarded as a sequence of entry points. A previous definition in this context means that a deliberate coupling at that entry point and/or line is envisaged which is foreseeable beforehand; i.e. by aiming a light beam at such a point and/or line. When the body of the preform remains in the same position throughout the process, there will preferably be an entry point, while an entry line would preferably be used in case the body is being moved with respect to the light source arrangement and/or coupling arrangement. For instance, when a PET preform for producing a bottle is to be heated, it can be rotated about a rotation axis defined by the middle axis of the tubular shape of the preform's body. In this case, a directed light beam would be aimed at one particular first entry point and then, by rotating the preform, an entry line will be automatically described by the preform's rotary motion, which entry line is the line from the first entry point along the surface of the preform in the direction of the rotation. Instead of using a single light beam, it is also possible to aim several light beams simultaneously or successively at such an entry point or line.

In a preferred embodiment of the heating system the light source arrangement comprises at least one light source and at least one optical fibre to transport a number of light beams in the direction of the body. The optical fibre can be considered to be an extension of the light source itself which transports a light beam from its point of origin, i.e. the light source, to an emission point, i.e. the end of the optical fibre, from where the beam is directed toward and coupled into the body of the preform. Optical fibres in this context offer the possibility to change the direction of the light beam and/or to further direct light beams so that the coupling of the beam into the body can be easily controlled at any time.

It is further preferred that the coupling arrangement is arranged such that the light from the light source arrangement is coupled into the body in a direction angular to a traversal direction defined by a shortest direct line between the first surface and the second surface at the point where the light, e.g. a light beam, is coupled into the body. Such angular direction to the traversal direction (as defined above) can be tangential from a side of the body of the preform or also perpendicular to the traversal direction, for example light coming from below or above the object and travelling right in between the two surfaces. In the latter case, this implies that the light beam need not necessarily be reflected by total internal reflection but may be directed in a parallel path to the first and second surfaces, if these two surfaces are parallel, too. However, as even a directed light beam often spreads out when being released from a light source, at least part of its light will probably be reflected at the surfaces even in such a case. In the former case, total internal reflection is a very preferred method of achieving that the light beam stays within the body of the preform.

It is generally possible to couple the light beam into the body directly, or via an air gap, from the light source or from an optical fibre connected to the light source of a light source arrangement. In such a case, the distance between the emitting end of the light source arrangement and the body of the preform is preferably at most some centimeters.

However, it may be of great advantage if the coupling arrangement comprises an intermediate coupling material through which the light from the light source arrangement can be guided by direct contact from the light source arrangement into the body. Such intermediate coupling material will thus be in contact both with an emission point of the light source arrangement and with a surface of the object at the point where a light beam is coupled into the body.

Concerning the material used for such intermediate coupling material, its physical characteristics may be of relevance, in particular its flexibility to adapt to the surface of the body of the preform and its capability to stick to both the body of the preform and the emitting end of the light source arrangement.

According to a first preferred alternative, such a coupling material is a transparent polymer, preferably a flexible polymer, e.g. silicone, while a second alternative consists of a coupling arrangement wherein the coupling material is a liquid, preferably water or an oil.

The choice of the material used for the coupling material highly depends on the material of the body of the preform, in particular on its refractive index. It is thus preferred that the coupling material has a refractive index between a refractive index of the body of the preform and a refractive index of a light emitting surface material of the light source arrangement.

A liquid, in particular water, may be preferred for another reason than its light transmission characteristics: When a certain critical temperature of the preform has been reached, i.e. about 100° C., the water will readily evaporate and thus automatically decouple the light beam input into the preform. As PET preforms should not be heated far above 100° C., water has been found to be a preferred coupling material in the context of heating PET materials. Naturally, for preforms with different melting points, other liquids with an analogous evaporation temperature will be preferred. So applying a droplet of a liquid in between the emission point of the light source arrangement and the body of the preform is an effective way to couple light beams into and de-couple light beams from the preform.

In order to avoid a re-coupling of the light beam in a backward direction at the point where the light beam is coupled in, it is further preferred that the coupling arrangement is arranged such that an angle at which the number of light beams is coupled into the body is such that the main part of the light from the light source arrangement does not return to the point where the light is coupled into the body. Referring, for illustration, to a tubular body of a preform with a longitudinal extension perpendicular to a round cross-sectional shape of the body, coupling in a light beam in such way that it is not redirected to the point where light is coupled in can be realized, for example, by directing it into the preform at an angle which is different from an angle which is exactly perpendicular to the longitudinal extension. That way, the light is guided along the circumference of the body in a helix while "climbing" upwards or downwards along the longitudinal extension rather than hitting the point again where it has been coupled in.

The method according to the invention can be realized with a single light source and/or only one light emitting surface from which directed light is coupled into the body. In many circumstances, however, it may be considered advantageous to have a heating system with a plurality of light emitting surfaces, at which a directed light beam is emitted. This way, the preform can be heated more effectively and more rapidly and different regions of the preform can be heated exactly according to their need for heating energy. Such light emitting surfaces can be distributed so as to be at a constant distance with respect to each other. However, those distances can also be varied and adapted to the special needs with respect to particular shapes of preforms. An unequal distribution may make sense, for example, in a case where a preform per se is of uneven shape and thus comprises regions with a higher need for energy input and regions with a lower need for energy input.

According to a particularly preferred embodiment of the invention, the heating system comprises transfer means arranged to move the body along a route while being heated. In analogy with today's heating systems in which preforms are usually also moved along a production line system, the system according to the invention may also use such transfer means in order to transport the preforms during the heating process up to a moulding system where the heated preforms are brought into their desired shape.

In such a case, it is especially preferred that the coupling arrangement is arranged such that the light from the light source arrangement is coupled into the moving body at a pre-defined entry point or entry line. This means that the light beam moves together with the moving body, which can be realized for example by moving the emission direction of the light source arrangement. However, it is particularly advantageous to have a light source arrangement and/or a coupling arrangement arranged in such way as to be moved at least partially synchronously with the body. This can either be realized by such a light source arrangement being integrated in a moving part of such a production line or by moving the light source arrangement and/or the coupling arrangement entirely or in part synchronously by means of another moving device. For example, an optical fibre as part of the light source arrangement can be moved along a route in parallel with the preform. In any case, such synchronous movement makes sure that the heating takes place at a constant energy imput rate throughout the moving and heating process. This way it can be guaranteed that the preform, although moving, will have reached its intended temperature at the time when it arrives at the moulding system.

As an alternative to moving either the light source arrangement or the coupling arrangement, these elements of the heating arrangement can alternatively be stationary, which is a particularly preferred embodiment of the invention because of the ease of handling and reduced necessity of mechanical movement of parts apart from the preforms themselves. In such a case, the preforms will move along the route, passing the emitting surface(s) of the heating system from where light is coupled into their bodies when the prerequisites, in particular the suitable coupling angle, are met. In order to ensure that a deliberate coupling takes place, the orientation of the light emitting surface will be accordingly and/or there may be control devices to control the position of the bodies of the preforms in order to detect when light beams can be coupled into a body of a particular preform under the required circumstances. This would then trigger a pulsed output of a light beam in the direction of this particular preform's body. The invention therefore also comprises a heating system with a control device arranged to control the timing of an output of directed light from the light source arrangement and/or the coupling arrangement such that light is output from a light emitting surface when a body of a preform is in a light path of that light emitting surface, i.e. when light can be emitted into the body from that light emitting surface in the way according to the invention.

BRIEF DESCRIPTION OF THE DRAWINGS

In the drawings, like numbers refer to like objects throughout the description. Objects are not necessarily drawn to scale.

DETAILED DESCRIPTION OF THE EMBODIMENTS

FIGS. 1 and 2 have already been discussed above.

Figure 3:
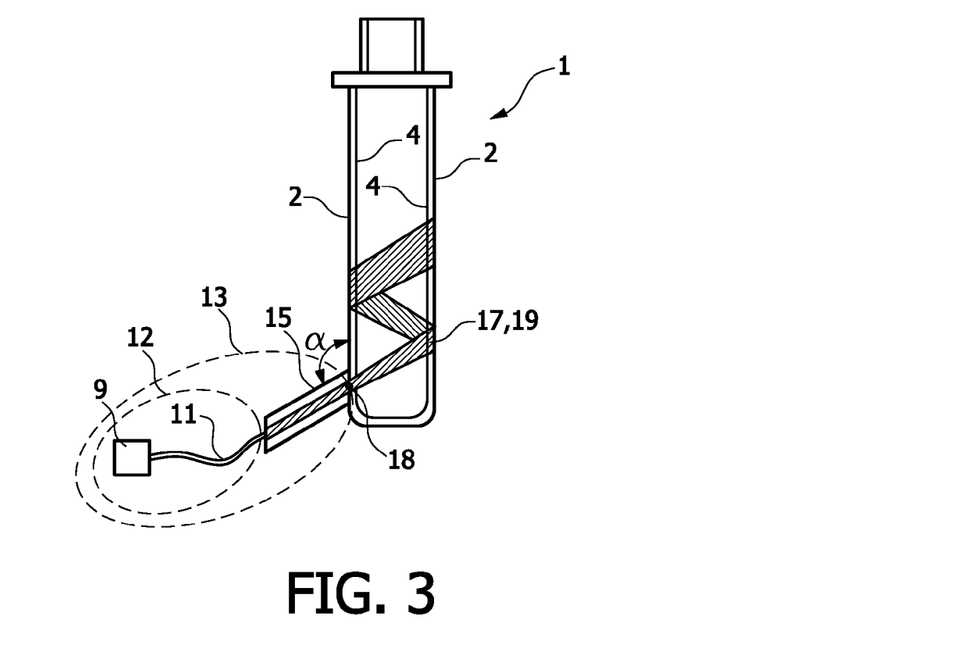
FIG. 3 shows a schematic sectional view of a first embodiment of a heating system according to the present invention.
Figure 4:
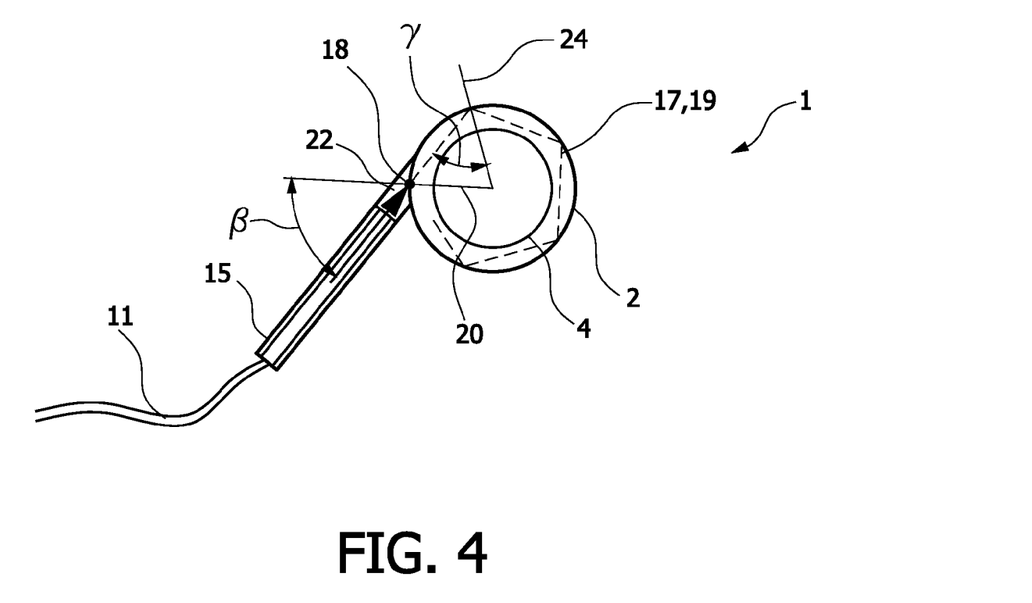
FIG. 4 shows a cross-sectional view of the same embodiment as in FIG. 3.

FIGS. 3 and 4 show a first embodiment of a heating system 13 according to the invention, which is used for heating up the body 1 of a preform of the kind as depicted in FIG. 1, i.e. with a tubular shape. It may be understood, however, that preforms can have all kinds of shapes, mainly depending on the intended final shape of the resulting piece after a moulding process which is carried out after the heating of the preform.

The heating system 13 comprises a light source arrangement 12 and a coupling arrangement 15. The light source arrangement 12 includes a light source 9—in this case a laser diode emitting laser light of a wavelength of 970 nm—and an optical fibre 11 which leads the laser light to the coupling arrangement 15. In the depicted example, the coupling arrangement 15 comprises a silicone end piece 22 (which can be seen in FIG. 4) which functions as an optical material similar to an optical fibre.

A laser light beam 17 is emitted from light source 9 and passes through the optical fibre 11 into the coupling arrangement 15 and further into the body 1 of the preform, thereby entering the body 1 at an entry point 18 on the first surface 2. It is guided along a longer path 19 within the body 1 of the preform, describing a helical path in an upward direction. This causes the light beam 17 to be absorbed by the material of the body 1, which means that the body is heated up.

In order to deliberately couple in the light beam 17 in a way that ensures that it remains within the two surfaces 2, 4 over a longer distance, the silicone end piece 22 has a shape at its end facing towards the body 1 of the preform which automatically defines an angle α in the sectional plane of FIG. 3 at which it can be brought into direct physical contact with the body 1 of the preform. As can be seen in FIG. 4, the coupling arrangement 15 is in contact with the body 1 via its silicone end piece 22 at an angle 13 with respect to the normal 20 of the circular shape of the first surface 2 at the entry point 18. Angle β is chosen such that light enters the body 1 within the acceptance angle range of the material of body 1. Therefore, a light beam 17 will stay in the body 1 because of total internal reflection. This is guaranteed because an angle γ of the light beam in the body with respect to normal 24 is above the critical angle at which the light beam would be coupled out of the body 1. Thus, as it travels further within the body 1, the light beam 17 is reflected at the first surface 2 by total internal reflection several times until it is finally completely absorbed. This way it describes a longer path 19 within the surfaces 2, 4 of the body 1.

Because the angle α at which the light beam is coupled in is unequal 90° with respect to the first surface 2 and with respect to the longitudinal axis of the preform, it is also avoided that the light beam returns to the entry point 18 where it might be coupled out of the body 1 in an uncontrolled manner.

Figure 5:
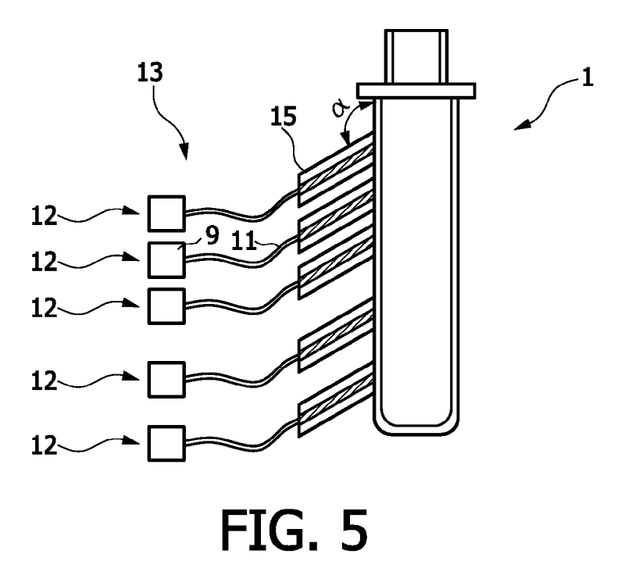
FIG. 5 shows a schematic sectional view of a second embodiment of a heating system according to the present invention similar to the embodiment shown in FIG. 3.

FIG. 5 shows a heating system comparable to the one described with reference to FIGS. 3 and 4, with the further improvement that several light source arrangements 12 (which can also be considered to be one light source arrangement comprised of several sub-arrangements 12) and coupling arrangements 15 (which can be defined accordingly as one light source arrangement) are provided. It can also be observed that in an upper part of the body 1 of the preform there are three evenly distributed, i.e. evenly spaced, coupling arrangements 15, while in the lower part of the body 1 the coupling arrangements 15 are unevenly spaced and further apart. Using such an improved heating system 13 with multiple light source arrangements 12 and coupling arrangements 15, i.e. with several light emitting surfaces, it is even easier to guarantee a high precision of the heating process with respect to local differences of the preform such as shape and/or material thickness and or composition. Apart from that, heating can be carried out a lot more rapidly and thus more effectively.

It may be noted that the coupling arrangement 15 can also be realized in many other ways. In particular, not shown in the Figures, a droplet of water could be used instead of the silicone end piece.

Figure 6:
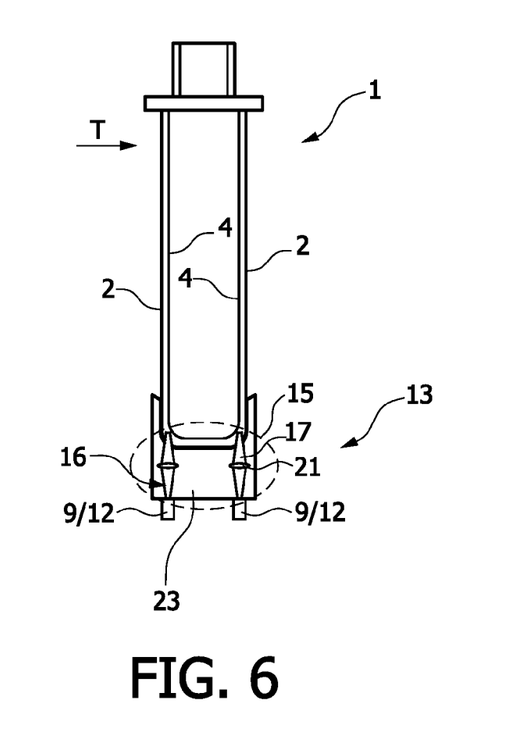
FIG. 6 shows a schematic sectional view of a third embodiment of a heating system according to the present invention.

FIG. 6 shows an alternative embodiment of a heating system 13 according to the present invention. In this case, the heating system is integrated in or connected to a preform holder 23 which holds the body 1 of the preform while it is being heated. During the heating process, the body 1 of the preform can also be moved by moving the preform holder 23. In this case, the two light source arrangements 12 of the embodiment are only comprised of two light sources 9, again realized as laser diodes emitting at 970 nm. These light sources 9 are attached to the bottom of the preform holder 23 and are each directed into a cavity 16 within the preform holder 23. Also within the cavity 16, there are coupling arrangements 21 in the form of lenses which are positioned in such way that the light beam 17 emitted by a light source (arrangement) 9/12 is directed right into the bottom of the body 1 of the preform. This way, the light beam 17 is coupled into the body 1 in a direction which is exactly perpendicular to the traversal direction T which has been mentioned above, i.e. in parallel with the longitudinal extension of the two surfaces 2, 4. This particular form of arrangement of a heating system 13 according to the present invention thus provides a possibility to make guidance of the light beam 17 through the body 1 by means of total internal reflection not essentially necessary. However, total internal reflection may still play a considerable role, because the beams 17 will most probably spread apart, particularly through the effect of the lenses 21, which means that part of the rays of the light beams 17 will be reflected by total internal reflection. Only those rays which are exactly parallel to the longitudinal extension of the two surfaces 2, 4 need not be reflected.

This embodiment according to the present invention is particularly advantageous insofar as the light source arrangement 12 and the coupling arrangement 21 are integral parts of the preform holder 23 and therefore can be fixedly installed, enabling the coupling angle at which the light beam 17 is coupled into the body to be accurately predetermined for a longer period of time without any further ado. In addition (not shown), water can be inserted into the preform holder 23 to provide direct physical contact between the body 1 of the preform and the preform holder. Thus, water would serve as a coupling medium and hence as part of a coupling arrangement.

Figure 7:
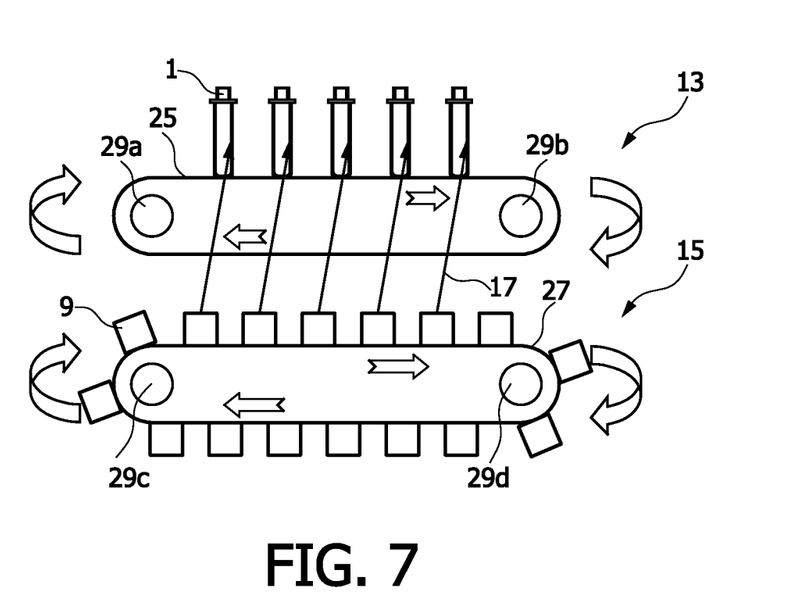
FIG. 7 shows a schematic sectional view of a fourth embodiment of a heating system according to the present invention including a production line system.

FIG. 7 shows an embodiment according to the invention using two production lines 25, 27. Both production lines 25 and 27 are moved simultaneously along rolls 29a, 29b and 29c, 29d, respectively. While the first production line 25 moves bodies 1 of preforms, the second production line 27 moves light sources 9 in parallel.

The arrangement of the heating system 13 is based on the principle of the invention as depicted in FIG. 3, i.e. coupling a laser beam 17 into a body of a preform from a side and at a suitable angle which is in the acceptance angle range of the material of the body 1. However, no direct physical contact between the body and the heating system is made, so that the coupling arrangement 15 exists only in the sense that the light beams 17 are emitted at a certain angle with respect to the bodies 1 of the preforms, which is realized by the simultaneous movement of the light sources 9 together with the respective production line 27. In this sense, the second production line 27 and a control unit (not shown) which guarantees the simultaneous movement of the second production line 27 and the first production line 25 constitutes the coupling arrangement 15.

Figure 8:
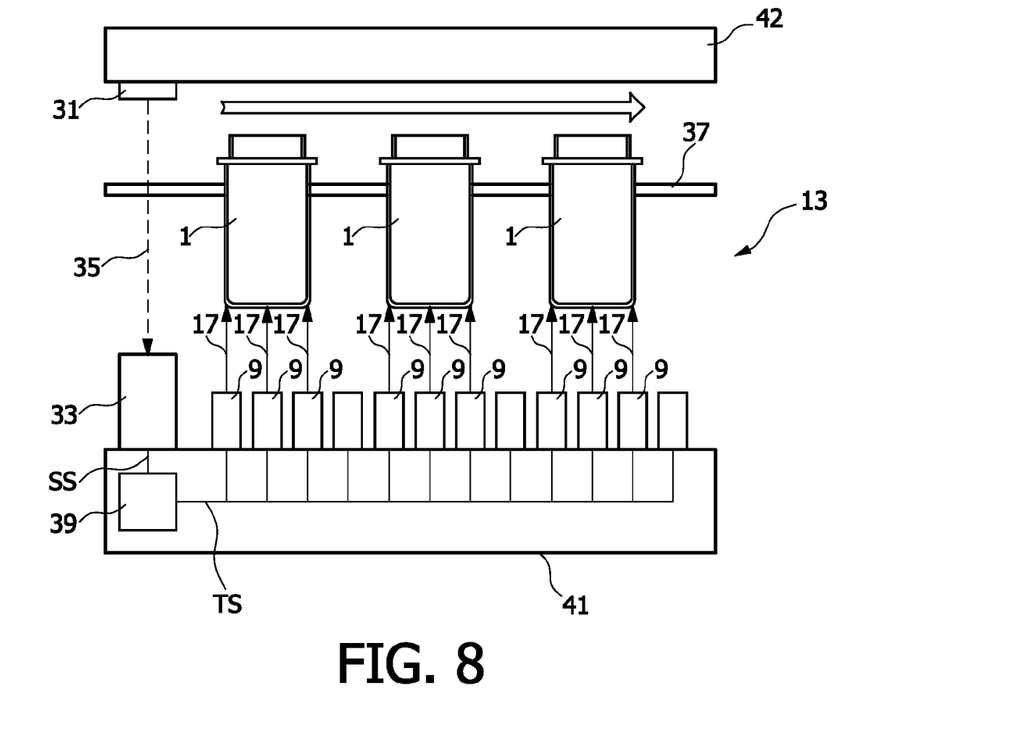
FIG. 8 shows a schematic sectional view of a fifth embodiment of a heating system according to the present invention including a production line system.

FIG. 8 shows another embodiment of the present invention, in which the bodies 1 are moved along a route. In this case, they are transported by means of a (symbolized) transport system 37. The bodies 1 are moved in between a top side 42 and a bottom side 41 of the heating system 13. On the top side there is attached a light ray transmitter 31, while at the corresponding end of the bottom side 41, there is positioned a light ray receiver 33. These two elements, together with a control device in the form of a control circuit 39 which receives sensing signals SS, make up a photoelectric barrier. This barrier is used for sensing when a body 1 enters the heating system 1. Depending on the sensing signals SS, the control circuit 39 triggers triggering signals TS to light sources 9 which are positioned on the bottom side 41 and directed towards the top side 42. The triggering signals TS will trigger a light emission from those light sources 9 above which a body 1 of a preform is currently positioned. Thus, a directed light beam 17 is sent deliberately in the direction of the preforms. The heating system 13 may be realized by a bottom side 41 shaped like a basin in which water or another suitable liquid is stored as a coupling medium. The light sources 9 may be arranged below a transparent part of the basin.

For example, in a first preferred embodiment, the cross section of the basin can be realized as depicted in principle in FIG. 6 with respect to the preform holder. In this case, the transport system 37 may be realized e.g. by moving rubber rolls, which initiate a rolling movement of the preforms, such that the preforms are rotated and every point of the side wall of every preform is exposed along its circumference to light beams from the light sources 9 for a sufficient time period during the movement of the preform along the production line.

Figure 9:
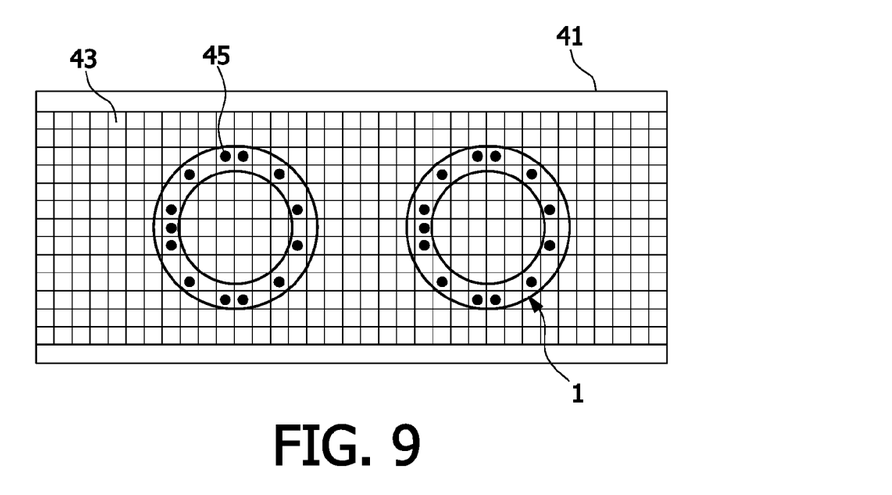
FIG. 9 shows a schematic top view of a possible bottom part of the fifth embodiment.

FIG. 9 shows in a top view how such a bottom side 41 can be realized advantageously according to a second embodiment. The light sources 9 (see FIG. 8) are arranged in an array over which bodies 1 of preforms are moved. Only the light sources 9, over which a preform body is currently positioned are activated. Therefore, there is a distinction between inactive light sources 43 and activated light sources 45. Upon moving the preforms along their path, different light sources 9 will be activated according to the triggering signals TS.

Although the present invention has been disclosed in the form of a number of preferred embodiments, it is to be understood that additional modifications or variations could be made to the described embodiments without departing from the scope of the invention. For example, the moving devices may be altered in many ways as well as the arrangement of light sources and of coupling arrangements. As could be seen with reference to the Figures, a light source arrangement may comprise several sub-arrangements as may also be the case with coupling arrangements.

For the sake of clarity, it is to be understood that the use of "a" or "an" throughout this application does not exclude a plurality, and "comprising" does not exclude other steps or elements. A "unit" can comprise a number of units, unless otherwise stated. It is especially noted that "a number of light beams" may be made up of a single light beam or a plurality of light beams.

The invention claimed is:

1. A heating system for heating a body of a preform, the heating system comprising:
   a body of a preform having a material thickness bounded by a first surface and a second surface,
   a light source arrangement for emitting light, and
   a coupling arrangement having a longitudinal axis and being directly connected to the body so that the longitudinal axis defines a first angle with the first surface other than 90 degrees and a second angle offset from normal of the first surface such that the coupling arrangement is arranged to couple light from the light source arrangement into the body at a third angle above a critical angle at which the light would be coupled out of the body and relative to the first surface wherein the light travels along a longer path that is at least twice as long as the shortest distance between the first and second surfaces within the material of the body between the first and second surfaces until at least half of the energy of the light is absorbed by the body.

2. A heating system according to claim 1, wherein the coupling arrangement is arranged such that light from the light source arrangement is coupled into the material of the body and guided between the first and second surfaces by total internal reflection.

3. A heating system according to claim 1, wherein the coupling arrangement is arranged such that the light from the light source arrangement is guided between the first and second surfaces until the light is completely absorbed.

4. A heating system according to claim 1, wherein the coupling arrangement is arranged such that the light from the light source arrangement is coupled into the body at a previously defined entry point and/or along a predetermined entry line.

5. A heating system according to claim 1, wherein the light source arrangement comprises at least one light source and a number of optical fibres to transport a number of light beams in the direction of the body.

6. A heating system according to claim 1, wherein the body comprises a tube and the coupling arrangement is arranged to couple light from the light source arrangement into the circumference of the body in a helix pattern within the material of the body.

7. A heating system according to claim 1, wherein the coupling arrangement comprises an intermediate coupling material through which the light from the light source arrangement can be guided from the light source arrangement into the body.

8. A heating system according to claim 7, wherein the coupling material is a transparent polymer or a liquid.

9. A heating system according to claim 7, wherein the coupling material has a refractive index between a refractive index of the body of the preform and a refractive index of a light emitting surface material of the light source arrangement.

10. A heating system according to claim 1, wherein at least 80% of the energy of the light is absorbed by the body while travelling within the body.

11. A heating system according to claim 1, further comprising a plurality of light emitting surfaces where a directed light beam is emitted.

12. A heating system according to claim 1, further comprising transfer means arranged to move the body along a route while it is being heated.

13. A heating system according to claim 12 further comprising a control device realized to control the timing of an output of directed light from the light source arrangement and/or the coupling arrangement such that light is output from a light emitting surface when a body of a preform is in a light path of that light emitting surface.

14. A heating system according to claim 1, wherein the light source arrangement comprises at least one laser emitting light source emitting laser light at a wavelength of 800 nm and/or 970 nm.

* * * * *